(12) United States Patent
Boyl-Davis et al.

(10) Patent No.: US 7,677,181 B2
(45) Date of Patent: Mar. 16, 2010

(54) INTERLOCKING PRECISION FLEXIBLE RAIL SYSTEM

(75) Inventors: Theodore M. Boyl-Davis, Snohomish, WA (US); Ronald W. Outous, Shoreline, WA (US)

(73) Assignee: The Boeing Company, Chicago, IL (US)

( * ) Notice: Subject to any disclaimer, the term of this patent is extended or adjusted under 35 U.S.C. 154(b) by 441 days.

(21) Appl. No.: 11/556,945

(22) Filed: Nov. 6, 2006

(65) Prior Publication Data
US 2008/0105158 A1 May 8, 2008

(51) Int. Cl.
*E01B 23/04* (2006.01)
(52) U.S. Cl. .................................. 105/29.1; 238/10 R
(58) Field of Classification Search ............... 238/10 B, 238/10 C, 178, 218–220; 105/29.1, 29.2; 104/106, 110
See application file for complete search history.

(56) References Cited

U.S. PATENT DOCUMENTS

| 152,502 | A | * | 6/1874 | May | 238/131 |
|---|---|---|---|---|---|
| 1,130,610 | A | * | 3/1915 | Kane | 403/339 |
| 1,655,766 | A | * | 1/1928 | Hildebrant | 403/340 |
| 2,277,281 | A | * | 3/1942 | Vinton | 280/603 |
| 2,931,315 | A | * | 4/1960 | Daigle | 104/111 |
| 3,540,153 | A | * | 11/1970 | Aoki | 446/446 |
| 3,819,198 | A | * | 6/1974 | Groves | 280/603 |
| 4,600,211 | A | * | 7/1986 | Schmidt | 280/603 |
| 5,043,052 | A | * | 8/1991 | Sakai | 204/623 |
| 5,070,792 | A | * | 12/1991 | Harris | 105/29.1 |
| 5,101,734 | A | * | 4/1992 | Sakai | 104/89 |
| 5,150,655 | A | * | 9/1992 | Sakai | 104/89 |
| 5,323,962 | A | * | 6/1994 | Jassby et al. | 238/10 R |
| 5,687,649 | A | * | 11/1997 | Koeninger et al. | 104/106 |
| 5,735,214 | A | | 4/1998 | Tsuboi | |

(Continued)

FOREIGN PATENT DOCUMENTS

WO    WO99/12786 A    3/1999

OTHER PUBLICATIONS

Thompson, Paul, Hartmann,John, Feikert, Ed, Buttrick, Jim, Flex Track for use in Production, SAE 2005-01-3318, 2005.

*Primary Examiner*—S. Joseph Morano
*Assistant Examiner*—Zachary Kuhfuss
(74) *Attorney, Agent, or Firm*—Felix L. Fischer

(57) ABSTRACT

An interlocking precision flexible rail system for carrying a positionable machine tool employs a first rail element having a first step on a lower surface extending from a first end to a termination at a predetermined length and a second rail element having a mating step on an upper surface extending from a second end to receive the first step. A pair of first clips is removably affixed to a top surface of the first rail element adjacent the first end with a first pin and to the second rail element with a second pin in each clip. A pair of second clips is removably affixed to a bottom surface of the second rail element adjacent the second end with a third pin and to the first rail element with a forth pin in each clip. Alignment holes to receive the pins have tolerances defined in conjunction with the predetermined length of the step, the length of the step allowing a reduced tolerance. The first and second pairs of clips and associated pins laterally secure the rail elements in mated engagement.

18 Claims, 3 Drawing Sheets

U.S. PATENT DOCUMENTS

| | | | | |
|---|---|---|---|---|
| 5,794,846 A * | 8/1998 | Barrett | ................. | 238/10 E |
| 6,125,765 A * | 10/2000 | Loomer | .................. | 104/89 |
| 6,328,500 B1 * | 12/2001 | Rubio | .................. | 404/32 |
| 6,494,307 B1 * | 12/2002 | Kozak et al. | ............. | 198/465.1 |
| 6,647,893 B1 * | 11/2003 | Fugitt et al. | .................. | 104/69 |
| 6,843,328 B2 * | 1/2005 | Boyl-Davis et al. | ............ | 173/32 |
| 6,883,719 B2 * | 4/2005 | Pyrce | .................. | 238/10 B |
| 6,926,094 B2 * | 8/2005 | Arntson et al. | ................. | 173/32 |
| 7,112,018 B2 * | 9/2006 | Boyl-Davis et al. | ......... | 409/178 |
| 7,182,024 B2 * | 2/2007 | Pfeiffer | .................. | 104/119 |
| 7,216,408 B2 * | 5/2007 | Boyl-Davis et al. | ......... | 29/33 R |
| 7,406,758 B2 * | 8/2008 | Jones et al. | ................. | 29/34 B |
| 2003/0116331 A1 | 6/2003 | Boyl-Davis et al. | | |
| 2004/0084545 A1 * | 5/2004 | Pyrce | .................. | 238/10 A |
| 2005/0263949 A1 * | 12/2005 | Boyl-Davis et al. | ......... | 269/266 |

* cited by examiner

INTERLOCKING PRECISION FLEXIBLE RAIL SYSTEM

BACKGROUND OF THE INVENTION

1. Field of the Invention

This invention relates generally to the field of reconfigurable manufacturing tooling systems and more particularly to a flexible rail system for automatic positioning drill or tool systems which is unlimited in extension length and remains flexible over interlocking extensions.

2. Description of the Related Art

The use of automated positioning tooling systems for fabrication of large structural elements on aircraft and other large systems is prevalent in current manufacturing practice. However, precision flexible rail systems for tool positioning are difficult to make and handle in long lengths. To solve this problem rails are made in short lengths of 4 to 7 feet. To achieve a long rail the rails are simply spliced together. However, technical challenges arise in the splice. A typical splice tends to be crooked at the joint. While match drilling can make a straight joint, the end result is a non-interchangeable rail set. Non interchangeability is highly undesirable and considered impractical in most manufacturing environments.

The key problem characteristics are the difficulty in making straight rail splices that are interchangeable and maintain the flex characteristics of a flexible rail There are other methods that have attempted to hold the rail joint reasonable straight, flexible and interchangeable. Unfortunately they all fall short of that goal. Examples include short and long sandwiching plates that carry stresses across each joint. The stresses are induced by bending the flexible rail to conform to a working surface Previous devices such as short metal sandwiching clips are too short in length to achieve interchangeability and repeatable accuracy at the same time. Long sandwiching plates can be accurate and interchangeable but add significant local stiffness to the flex-rail. This stiffness can cause significant flat spots when the rail is flexed to a work piece contour An exemplary prior art system and the tools positioned thereby is disclosed in U.S. Pat. No. 6,843,328 entitled Flexible Track Drilling Machine, having a common assignee with the present invention.

It is therefore desirable to provide unlimited-length rails for use with automatic position locking manual drills or tool positioning machines for use on new aircraft and other large structural system development programs. It is also desirable to provide a joint for use with such rails that is straight and interchangeable.

SUMMARY OF THE INVENTION

The present invention provides an interlocking precision flexible rail system for carrying a positionable machine tool employing a first rail element having a first step on a lower surface extending from a first end to a termination at a predetermined length and a second rail element having a mating step on an upper surface extending from a second end to receive the first step. A pair of first clips is removably affixed to a top surface of the first rail element adjacent the first end with a first pin and to the second rail element with a second pin in each clip. A pair of second clips is removably affixed to a bottom surface of the second rail element adjacent the second end with a third pin and to the first rail element with a forth pin in each clip. The first and second pairs of clips and associated pins laterally secure the rail elements in mated engagement. Threaded fasteners secure the first pair of clips to the top surface of the first rail element and second rail element the second pair of clips to the lower surface of the first and second rail elements.

BRIEF DESCRIPTION OF THE DRAWINGS

These and other features and advantages of the present invention will be better understood by reference to the following detailed description when considered in connection with the accompanying drawings wherein.

DETAILED DESCRIPTION OF THE INVENTION

Figure 1A:
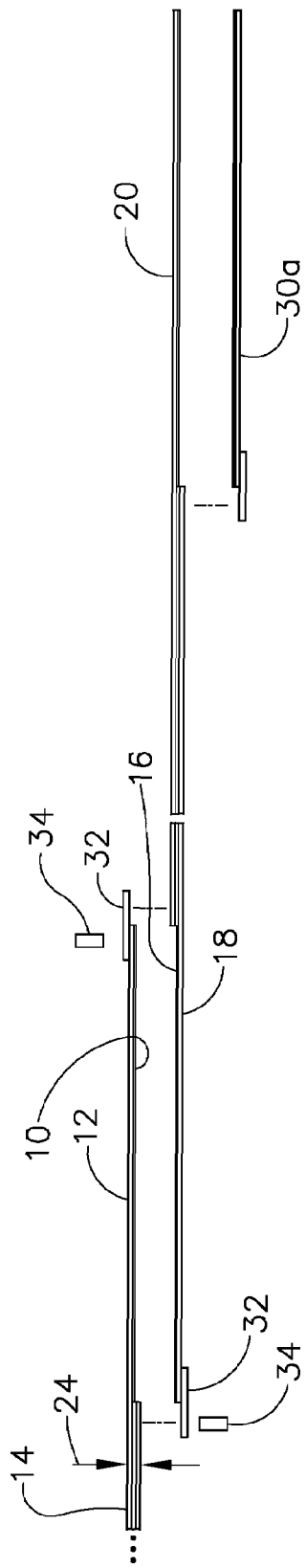
FIGS. 1a and 1b are side section views of the elements of flexible rail elements employed in a track employed with the present invention showing the first end of the track and the second end of the track respectively.

This invention achieves the three most desired traits in a precise-flex-rail splice. First it achieves a straight joint because it is made of relatively long stepped overlaps. Second it achieves interchangeability because the alignment pins are separated by far enough distance that reasonable clearance can be used for assembly. Third, the stepped rail with short splice clips at each end does not compromise rail flexibility at the joint. As shown in FIG. 1 an interlocking feature is provided by a step 10 that is machined into a first end 12 of a first length of precision flexible rail 14 and a mating step 16 in a mating end 18 of a second length 20 of a precise flexible rail. The step is machined to substantially a half thickness of the rail from the underside of the first length and the top side of the second length directly down the center line where no stress occurs during bending of the rail. The rail elements have a high aspect ratio of width 22 to thickness 24 to maintain flexibility perpendicular to the upper surface 26 and lower surface 28 of the rail. In an exemplary embodiment, dimensions are typically rails of 3 inch width and 0.167 inches thickness. Thickness has less bearing on accuracy, and is more a factor of flexibility and compliance to a complex contour. Wider and thicker rails will translate into a more accurate system if used primarily on a flat surface, especially when positioning cantilevered loads where the flexing of rails is of great concern.

Figure 1B:
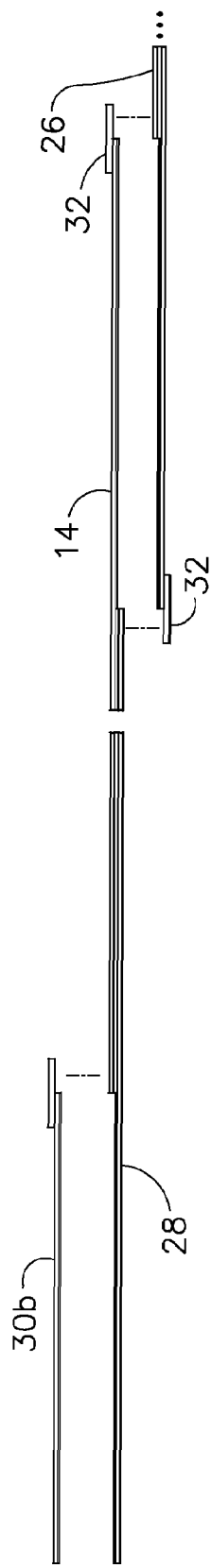

An end cap piece 30a, shown in FIG. 1a as a bottom end cap is attached on the machined splice joint at the first end of the second length of rail which constitutes the first end of the track. Similarly, a top end cap 30b is provided to attach to the machined second end of the flexible rail element at the second end of the track as shown in FIG. 1b.

Figure 2A:
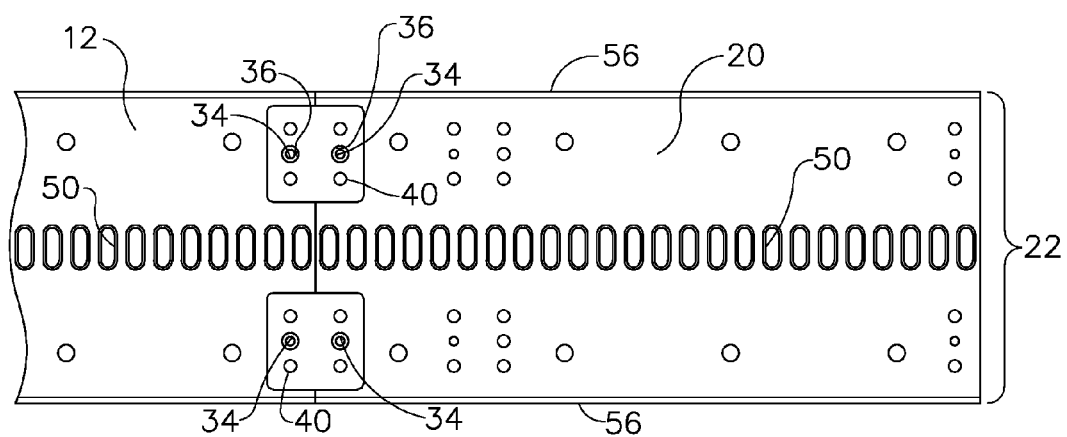
FIG. 2a is a top view of the assembled elements of the track of FIG. 1.
Figure 3:
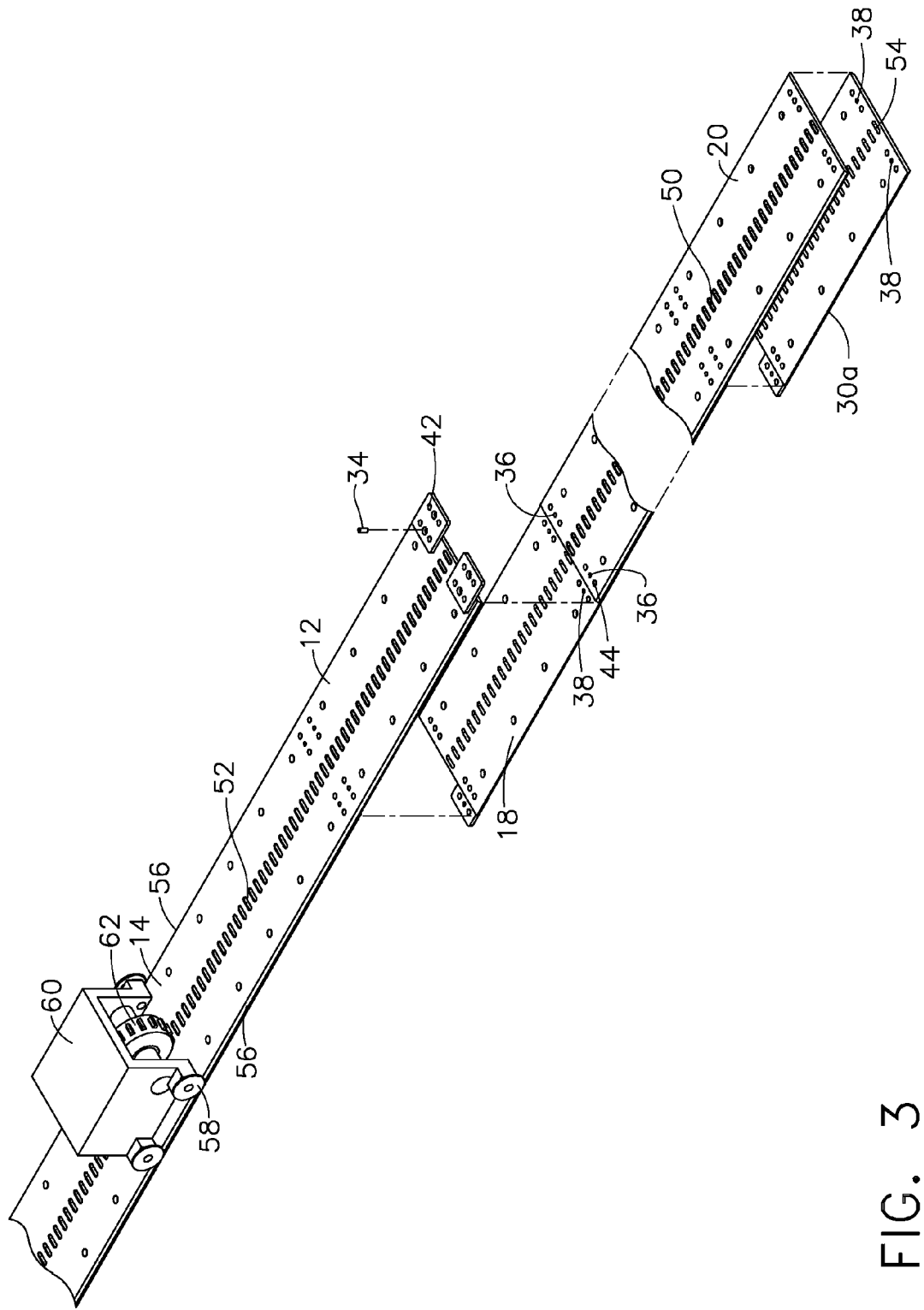
FIG. 3 is an isometric view of the exploded track elements of FIG. 1.

As shown in FIGS. 2a and 3, two metal clips 32 are fastened to the rail elements at the ends of each step on the upper and lower surfaces of the rails using pins 34 received in alignment holes 36 and 38 in the upper and lower step portions. Threaded fasteners 40 which are received through a pattern of mating holes 42 in the clips element and threaded holes 44 in the rail elements secure the clips to the rail elements. The clips and pins carry the compression and tension stresses that arise from flexing the rail while the fasteners secure the rail elements in position for use. A small amount of clearance is allowed for the pins to fit in each hole. Similar clearance is provided in the mating holes to receive the fasteners without interference due to tolerance build up. This clearance is relatively small compared to the distance separating the upper clip from the lower clip at opposite ends of the mating splice. In an exemplary embodiment, the step overlap is approximately 6 inches. This allows tolerancing of the hole/pins to be approximately 0.001 inch while maintaining a desired 0.0001 inch/inch overall tolerance. In prior art approaches a 1 inch overlap between 4 foot rails resulted in a 48 to 1 tolerance ratio whereas the present system at 8 to 1 significantly eases the tolerance requirement. For additional tolerance increase, a 12 inch overlap would result in a 4 to 1 ratio doubling the available tolerance relief The resulting package has interchangeability, precision, straightness and virtually uninterrupted flex characteristics.

For the embodiment shown in the drawings, the pins are separate elements from the clips which are inserted through concentric holes in the clip and rail element. In alternative embodiments, the pins are integral with a bottom surface of the clip.

Figure 2B:
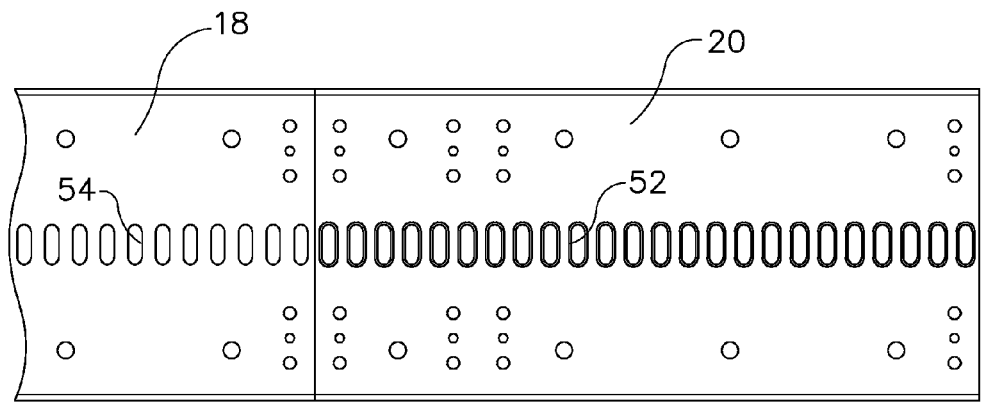
FIG. 2b is a top view of the first element of the track without the mated top element.

The flexible rail elements include machined tapered tooth apertures 50 to receive the drive gears of the automatic positioning drill or other tool operating with the track. The apertures are tapered from larger diameter ovaloid shape 52 in the top surface of the track to a smaller diameter ovaloid shape 54 in the bottom surface of the track as shown in FIG. 2b. In the overlapping steps on the track ends, the upper track element, either the first machined step or the top end cap employ the top diameter portion of the taper in the apertures while the second machined step as shown in FIG. 2b without the mating element attached, or the bottom end cap employ the bottom diameter portion of the taper. The engagement of the flexible rail elements by the clips with inserted pins maintains the upper and lower portions of the tapered ovaloid apertures in alignment.

For the embodiment shown in the drawings, the rail edges 56 are convex or triangular to accept lateral rollers 58 for positioning and securing the machine tool carriage 60 to the rail elements. The tool is movable on the assembled rail using a gear 62 engaged in the ovaloid tapered apertures in the track.

Having now described the invention in detail as required by the patent statutes, those skilled in the art will recognize modifications and substitutions to the specific embodiments disclosed herein. Such modifications are within the scope and intent of the present invention as defined in the following claims.

What is claimed is:

1. An interlocking precision flexible rail system for carrying a positionable machine tool comprising:
    a first rail element having a first step on a lower surface extending from a first end to a termination at a predetermined length;
    a second rail element having a mating step on an upper surface extending from a second end to receive the first step as a mating joint, said predetermined length providing an uninterrupted flex characteristic of the mated first and second rail elements;
    at least one first clip removably affixed to a top surface of the first rail element at the first end with a first pin engaged in a first alignment hole and to the second rail element with a second pin engaged in a second alignment hole; and,
    at least one second clip removably affixed to a bottom surface of the second rail element at the second end with a third pin in a third alignment hole and to the first rail element with a forth pin in a fourth alignment hole, the at least one first and second clips and associated pins laterally securing the rail elements in mated engagement, wherein the predetermined length is defined to allow a tolerance in the alignment holes.

2. An interlocking precision flexible rail system as defined in claim 1 further comprising a plurality of threaded fastening means for securing the at least one clip to the top surface of the first rail element and second rail element and a plurality of threaded fastening means for securing the at least one second clip to the lower surface of the first and second rail elements.

3. An interlocking precision flexible rail system as defined in claim 1 wherein the predetermined length results in a ratio of rail length to step length of between 8 to 1 and 4 to 1.

4. An interlocking precision flexible rail system as defined in claim 1 further comprising contoured apertures through each rail, said aperture contour having a first ovaloid shape in an upper portion and a second ovaloid shape in a lower portion, the first step including apertures of said first shape, said mating step including apertures of said second shape.

5. An interlocking precision flexible rail system as defined in claim 4 wherein an top end cap includes apertures of said first shape, a bottom end cap includes apertures of said second shape.

6. An interlocking precision flexible rail system as defined in claim 1 wherein the sides of the rail elements incorporate a contour across the thickness to engage lateral rollers supporting a positionable machine tool.

7. An interlocking precision flexible rail system for carrying a positionable machine tool comprising:
    a first rail element having a machined step of a predetermined length on a lower surface;
    a second rail element having a mating machined step on an upper surface to receive the first machined step as a mating joint, said predetermined length providing an uninterrupted flex characteristic of the mated first and second rail elements;
    said first rail element having a first plurality of machined alignment holes in the machined step and said second rail element having a second plurality of machined alignment holes in the mating machined step;
    a third plurality of clips having first holes substantially concentric with the first plurality of alignment holes and second holes substantially concentric with the second plurality of alignment holes with the first and second rail elements in mated engagement;
    a forth plurality of pins equal in number to the sum of the first and second plurality, said pins received through said first and second holes in the clips and received through said concentric first and second plurality of alignment holes to laterally secure the rail elements in mated engagement,
    wherein the predetermined length results in a ratio of rail length to step length of between 8 to 1 and 4 to 1.

8. An interlocking precision flexible rail system as defined in claim 7 wherein:
    the first rail element has a third plurality of threaded holes in a pattern;
    the second rail element has a fourth plurality of threaded holes in a mating pattern;
    the clips further having a plurality of third holes concentric with the third plurality of threaded holes, each of said third holes receiving a threaded fastener for engagement with the associated third plurality of threaded holes and a plurality of fourth holes concentric with the fourth plurality of threaded holes, each of said fourth holes receiving a threaded fastener for engagement with the associated fourth plurality of threaded holes.

9. An interlocking precision flexible rail system as defined in claim 7 wherein the first machined step and mating machined step have a length determined by a tolerance limit on the alignment holes.

10. A method for assembling an interlocking precision flexible rail system for carrying a positionable machine tool comprising the steps of:
    machining a step in a first high aspect ratio rail element on a lower surface extending from a first end to a termination at a predetermined length;
    machining a mating step in a second high aspect ratio rail element on an upper surface extending from a second end to receive the first step as a mating joint, said predetermined length adjusted to allow a desired tolerance in alignment holes and providing an uninterrupted flex characteristic of the mated first and second rail elements;
    and machining a first alignment hole in the first rail element and a second alignment hole in the second rail element, the tolerance of the first and second alignment holes determined by the predetermined length;
    machining a third alignment hole in the first rail element and a forth alignment hole in the second rail element, the tolerance of the third and forth alignment holes determined by the predetermined length;
        removably affixing at least one first clip to a top surface of the first rail element at the first end with a first pin engaged in the first alignment hole and to the second rail element with a second pin engaged in the second alignment hole; and,
        removably affixing at least one second clip to a bottom surface of the second rail element at the second end with a third pin in the third alignment hole and to the first rail element with a forth pin in the fourth alignment hole, the at least one first and second clips and associated pins laterally securing the rail elements in mated engagement.

11. A method for assembling an interlocking precision flexible rail system as defined in claim 10 further comprising the step of:
    installing a plurality of threaded fastening means for securing the at least one clip to the top surface of the first rail element and second rail element and a plurality of threaded fastening means for securing the at least one second clip to the lower surface of the first and second rail elements.

12. A method for assembling an interlocking precision flexible rail system as defined in claim 10 further comprising the step of defining the predetermined length as a ratio of rail length to step length of between 8 to 1 and 4 to 1.

13. A method for operating a positionable machine tool comprising the steps of:
    assembling an interlocking precision flexible rail system for carrying a machine tool by
    machining a step in a first rail element on a lower surface extending from a first end to a termination at a predetermined length which results in a ratio of rail length to step length of between 8 to 1 and 4 to 1;
    machining a mating step in a second rail element on an upper surface extending from a second end to receive the first step;
    removably affixing at least one first clip to a top surface of the first rail element at the first end with a first pin engaged in a first alignment hole and to the second rail element with a second pin engaged in a second alignment hole; and,
    removably affixing at least one second clip to a bottom surface of the second rail element at the second end with a third pin in a third alignment hole and to the first rail element with a forth pin in a fourth alignment hole, the at least one first and second clips and associated pins laterally securing the rail elements in mated engagement;
    attaching the machine tool to the assembled rail elements; and,
    positioning the machine tool along the assemble rail elements for operation.

14. A method for operating a positionable machine tool as defined in claim 13 wherein the assembling of the interlocking precision flexible rail system further comprises the step of:
    installing a plurality of threaded fastening means for securing the at least one clip to the top surface of the first rail element and second rail element and a plurality of threaded fastening means for securing the at least one second clip to the lower surface of the first and second rail elements.

15. A method for operating a positionable machine tool as defined in claim 13 wherein assembling the interlocking precision flexible rail system further comprises the step of defining the predetermined length to allow a desired tolerance in the alignment holes wherein the first rail element has a length of between 4 and 7 feet and the predetermined length is in a range between 6 inches with tolerance of the alignment holes at about 0.001 inch to 12 inches with tolerance of the alignment holes at about 0.002 inch while maintaining a 0.0001 inch/inch overall tolerance.

16. An interlocking precision flexible rail system as defined in claim 1 wherein the first rail element has a length of between 4 and 7 feet and the predetermined length is in a range between 6 inches with tolerance of the alignment holes at about 0.001 inch to 12 inches with tolerance of the alignment holes at about 0.002 inch while maintaining a 0.0001 inch/inch overall tolerance.

17. An interlocking precision flexible rail system as defined in claim 7 wherein the first rail element has a length of between 4 and 7 feet and the predetermined length is defined in a range between 6 inches with machined tolerance of the first and second plurality of alignment holes at about 0.001 inch to 12 inches with machined tolerance of the alignment holes at about 0.002 inch while maintaining a desired 0.0001 inch/inch overall tolerance.

18. The method as defined in claim 12 wherein the first rail element has a length of between 4 and 7 feet and the predetermined length is in a range between 6 inches with machined tolerance of the first and second plurality of alignment holes at about 0.001 inch with machined tolerance of the alignment holes at about 0.002 inch while maintaining a desired 0.0001 inch/inch overall tolerance.

* * * * *